(12) United States Patent
Jedele et al.

(10) Patent No.: US 7,267,208 B2
(45) Date of Patent: Sep. 11, 2007

(54) RETENTION SPRING FOR BRAKE PRESSURE PADS

(75) Inventors: Philip N Jedele, Plymouth, MI (US); Seiji Nishimura, West Bloomfield, MI (US); Tadasake Fujiwara, West Bloomfield, MI (US)

(73) Assignee: Akebono Corporation, Elizabethtown, KY (US)

( * ) Notice: Subject to any disclaimer, the term of this patent is extended or adjusted under 35 U.S.C. 154(b) by 0 days.

(21) Appl. No.: 11/011,987

(22) Filed: Dec. 14, 2004

(65) Prior Publication Data

US 2006/0124408 A1 Jun. 15, 2006

(51) Int. Cl.
*F16D 65/04* (2006.01)

(52) U.S. Cl. .................................... 188/73.38

(58) Field of Classification Search ... 188/73.36–73.38
See application file for complete search history.

(56) References Cited

U.S. PATENT DOCUMENTS

| | | | |
|---|---|---|---|
| 3,450,234 A | 6/1969 | Takata | |
| 3,712,423 A | 1/1973 | Girauldon | |
| 3,754,624 A * | 8/1973 | Eldred | 188/71.5 |
| 3,783,980 A | 1/1974 | Kallmeyer | |
| 3,841,444 A | 10/1974 | Baum et al. | |
| 3,937,304 A | 2/1976 | Brix | |
| 3,980,160 A | 9/1976 | Hoffmann et al. | |
| 4,027,749 A | 6/1977 | Yamamoto et al. | |
| 4,067,418 A * | 1/1978 | Rath et al. | 188/72.4 |
| 4,219,105 A * | 8/1980 | Delaunay | 188/73.38 |
| 4,289,217 A * | 9/1981 | Heibel | 188/73.38 |
| 4,392,561 A | 7/1983 | Watanabe et al. | |
| 4,394,891 A * | 7/1983 | Oshima | 188/73.38 |
| 4,417,647 A | 11/1983 | Cotter et al. | |
| 4,428,463 A * | 1/1984 | Burgdorf et al. | 188/73.38 |
| 4,469,205 A * | 9/1984 | Stoka et al. | 188/234 |
| 4,527,669 A | 7/1985 | Meyer et al. | |
| 4,537,291 A | 8/1985 | Thiel et al. | |
| 4,643,277 A | 2/1987 | Bangert | |
| 4,658,938 A | 4/1987 | Thiel et al. | |
| 4,673,065 A * | 6/1987 | Gerard et al. | 188/73.38 |
| 4,969,540 A | 11/1990 | Cartwright et al. | |
| 4,993,520 A * | 2/1991 | Goddard et al. | 188/73.38 |
| 5,060,766 A | 10/1991 | Kondo | |
| 5,257,679 A * | 11/1993 | Weiler et al. | 188/73.32 |
| 5,538,103 A * | 7/1996 | Rueckert et al. | 188/72.3 |
| 5,875,873 A * | 3/1999 | Kay et al. | 188/73.38 |
| 5,947,234 A | 9/1999 | Shimazaki | |
| 6,179,095 B1 | 1/2001 | Weiler et al. | |
| 6,293,373 B1 | 9/2001 | Weiler et al. | |
| 2003/0136617 A1* | 7/2003 | Gherardi et al. | 188/73.38 |

FOREIGN PATENT DOCUMENTS

| | | | |
|---|---|---|---|
| DE | 3608577 | * | 9/1987 |
| DE | 44 42 795 | | 6/1996 |

(Continued)

*Primary Examiner*—Christopher P. Schwartz
(74) *Attorney, Agent, or Firm*—Dobrusin & Thennisch PC

(57) ABSTRACT

A brake caliper has a retention spring to eliminate excessive movement of the pressure plates or pad pin with respect to the caliper housing. The retention spring has a pad pin contacting portion to exert a force on the pad pin. The spring includes a retention portion continuous with the pad pin portion to provide counterforce to maintain the pad pin in position.

25 Claims, 3 Drawing Sheets

FOREIGN PATENT DOCUMENTS

| | | | |
|---|---|---|---|
| EP | 0 089 750 | | 9/1983 |
| EP | 0336103 | * | 2/1989 |
| EP | 1 234 996 | | 8/2002 |
| JP | 10184745 | * | 7/1998 |
| WO | WO 2005/012754 | | 2/2005 |

* cited by examiner

RETENTION SPRING FOR BRAKE PRESSURE PADS

The present invention relates to brake calipers and, more particularly, to brake pressure plate retention springs.

BACKGROUND OF THE INVENTION

Brake calipers surround wheel rotors to brake or slow the movement of the rotor and, in turn, a machine or vehicle. In order to slow the movement of the rotor, the caliper includes brake pads or brake pressure plates with a friction material which contacts the rotor to stop movement of the rotor. Some brake or pressure pads generally are of the hanging type. Thus, the pressure plate includes an aperture which enables a pad pin to pass through the aperture to secure it with the caliper housing. In order to prohibit noise or rattling of the pressure plate on the pad pin, large springs are used to exert a force on the pressure plate to keep it in position. In other types of hanging pressure plates, the plates include a small hole with tight tolerances so that the guiding pad pin fits tightly in the pressure plate hole. The same can be said of the caliper aperture. This can lead to corrosion which, in turn, can lead to difficult servicing, high drag and potential binding of the pads. Thus, it is desirable to have a hanging pressure plate that has a large clearance hole to reduce corrosion and minimize concerns. The extra clearance must then be taken up by the return clip.

SUMMARY OF THE PRESENT INVENTION

The present invention provides the art with a pressure plate retention spring. The retention spring has a compact design and is inexpensive to manufacture. The present invention enables a pressure plate to be used with a large opening wherein the retention spring takes up the play to reduce noise and rattle of the pressure plate on the brake caliper housing.

In accordance with the present invention, a retention spring includes a pad pin contacting portion which exerts a force on the pad pin and a pressure plate. The spring also includes a retention portion which is continuous with the contacting portion. The retention portion provides a counterforce to retain the spring clip in position. The retention spring may be coupled between the pad pin and the pressure plate or be mounted on a pad pin support on the caliper housing.

From the following detailed description taken in conjunction with the accompanying drawings and claims, other objects and advantages of the present invention will become apparent to those skilled in the art.

DETAILED DESCRIPTION OF THE PREFERRED EMBODIMENTS

Figure 1:
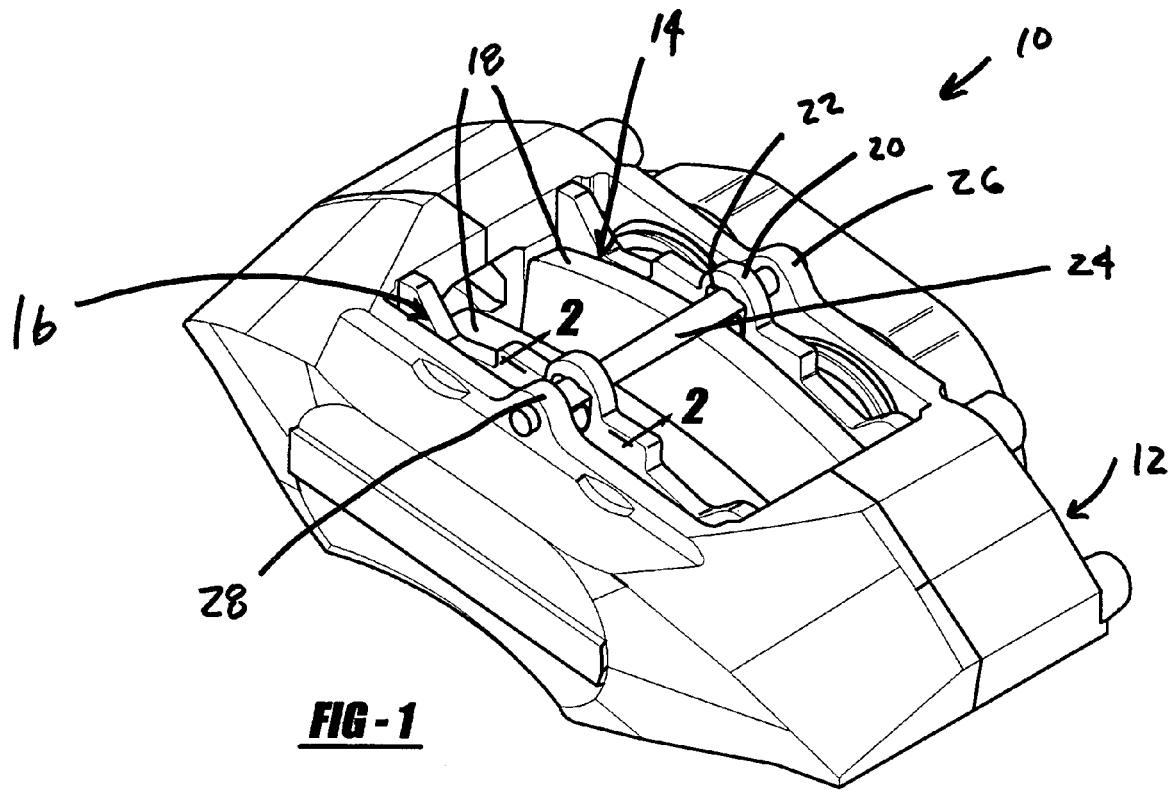
FIG. 1 illustrates a perspective view of a brake caliper in accordance to a first embodiment in the present invention.

Turning to the figures, particularly FIG. 1, a brake caliper is illustrated and designated with the reference numeral 10. The caliper includes a housing 12 with a pair of pressure plates 14 and 16 positioned within the housing 12. The pressure plates 14 and 16 include a friction material 18 which abuts a rotor (not shown) to stop rotation of the rotor. The pressure plates 14 and 16 include a support portion 20 which includes an aperture 22 to enable a pad pin 24 to pass therethrough to secure the pressure plates 14 and 16 on the caliper housing 12. The pad pin 24 has its ends secured in housing support members 26 and 28. The housing support members 26 and 28 are substantially identical.

Figure 2:
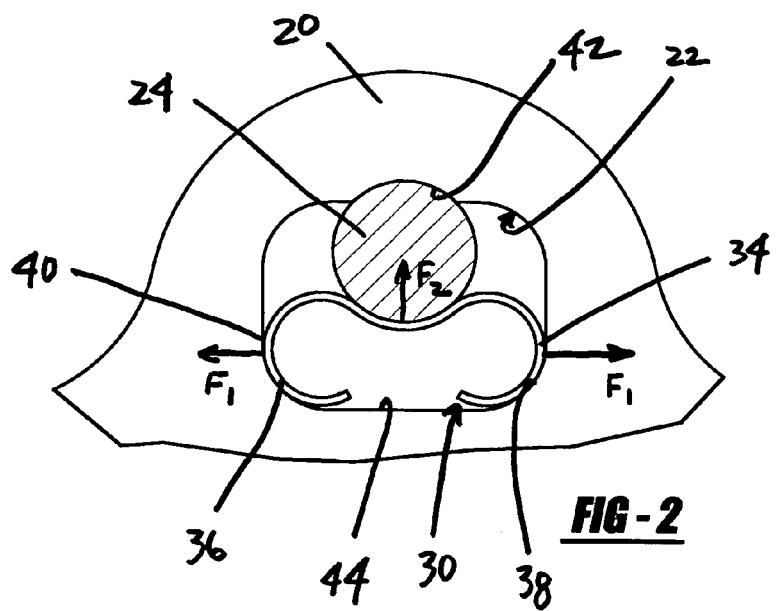
FIG. 2 is an enlarged partial side plan view of FIG. 1.
Figure 3:
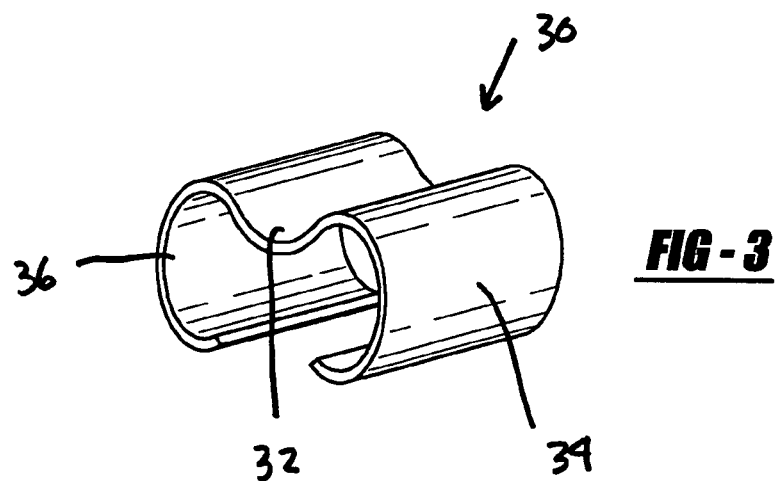
FIG. 3 is an enlarged perspective view of the retention spring of FIG. 1.

Turning to FIG. 2, a retention spring 30 is illustrated positioned in the aperture 22 of one of the pressure plates 14 or 16. It is noted that the retention spring 30 is normally positioned in both of the pressure plates 14 and 16. The retention spring 30 includes a pad pin contacting portion 32 and retention portions 34 and 36. The retention portions 34 and 36 are substantially identical. The retention spring 30 has a two opposing C-shaped configuration connected at one end and open at one end opposing the pad pin contacting portion 32. Ordinarily, the pad pin contacting portion 32 has a concave surface which is complementary to the convex arcuate portion of the pad pin 24. However, the contacting portion 32 may be flat. The retention portions 34 and 36 of the retention spring have convex arcuate portions which contact the walls 38 and 40 defined by the aperture 22. The ends of the retention portions 34 and 36, at the opening of the two opposing C-shaped configuration are directed toward the pad pin contacting portion 32.

The retention portions 34 and 36 apply a force F1 onto the walls 38 and 40 to retain the retention spring 30 within the aperture 22. A force F2 is exerted by the pad pin contacting portion 32 to force the pad pin against the wall 42 of the aperture 22.

Also, the retention portions 34 and 36 exert a force on wall portion 44 of aperture 22. The wall 44 exerts a counterforce on the retention portions 34 and 36 which, in turn, exert a force on the pad pin 24. The retention spring 30 retains the pad pin, as well as the pressure plates, in position to substantially reduce noise and rattle which may occur due to vibration of the caliper.

Figure 4:
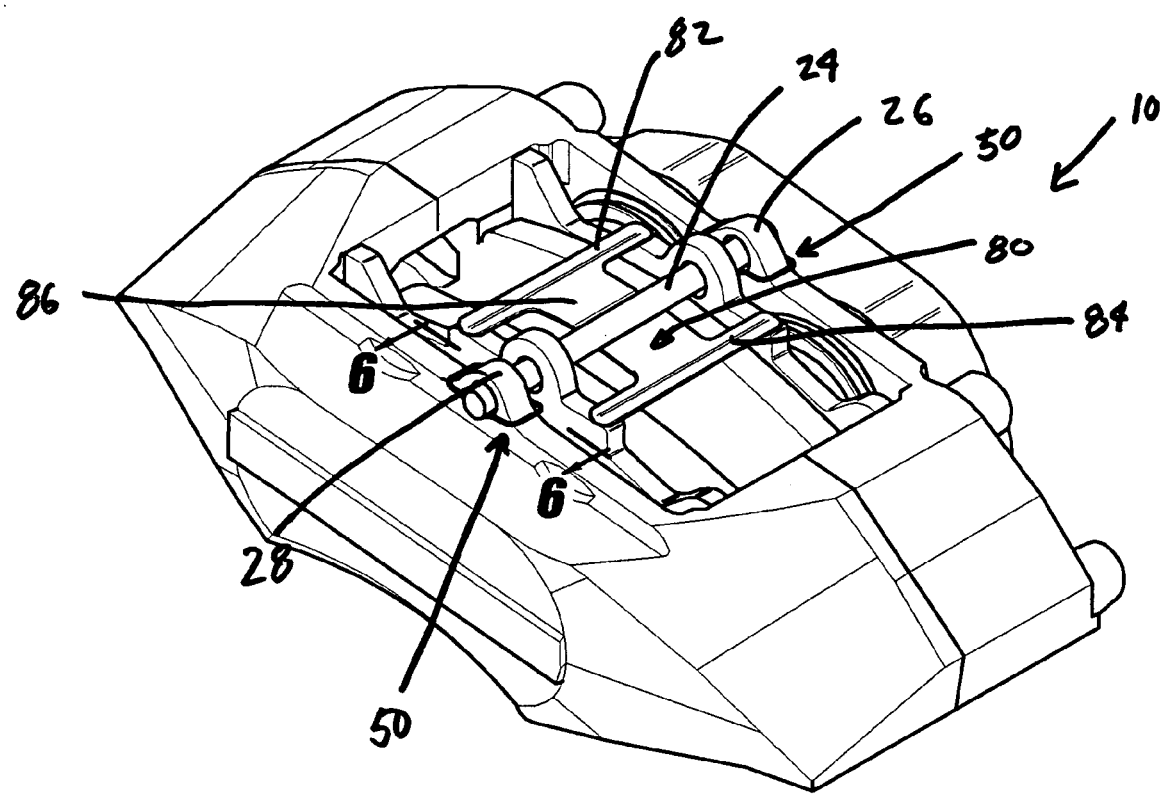
FIG. 4 is a perspective view of a brake caliper including a second embodiment of the present invention.
Figure 5:
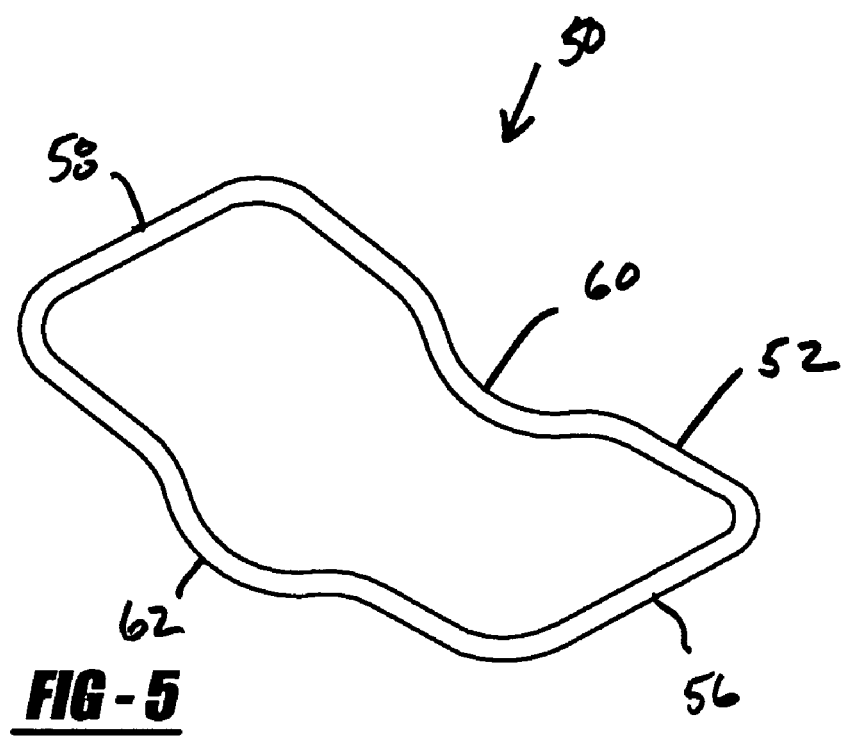
FIG. 5 is a perspective view of one of the springs of FIG. 4.

Turning to FIGS. 4 and 5, a second embodiment of the present invention is illustrated. The brake caliper 10 is substantially the same as that in FIG. 1 and has been identified with the same reference numeral. Likewise, the pressure plates, as well as the pad pin and pad pin support members, are the same and have been identified with the same reference numeral.

Retention spring 50 surrounds the pad pin support 26 to exert a force on the pad pin 24. The retention spring 50 has an overall closed rectangular shape with two greater legs 52 and 54 and two lesser legs 56 and 58. The greater legs 52 and 54 both include pad pin contacting portions 60 and 62. These pad pin contacting portions 60 and 62 may have an arcuate concave surface to receive the pad pin 24. As can be seen in FIG. 5, the retention spring 50 is positioned surrounding the pad pin support 26. The pad pin 24 contacts the contacting portion 60 and 62 forcing the spring 50 downward at that area. In turn, the lesser legs 56 and 58, which ride on the walls of the supports 26 and 28, push against the downward force of the pad pin 24. In turn, this forces the contacting portion 60 and 62 to exert an upward force on the pad pin 24 to maintain the pad pin in position to reduce noise and rattle due to vibration.

Figure 6:
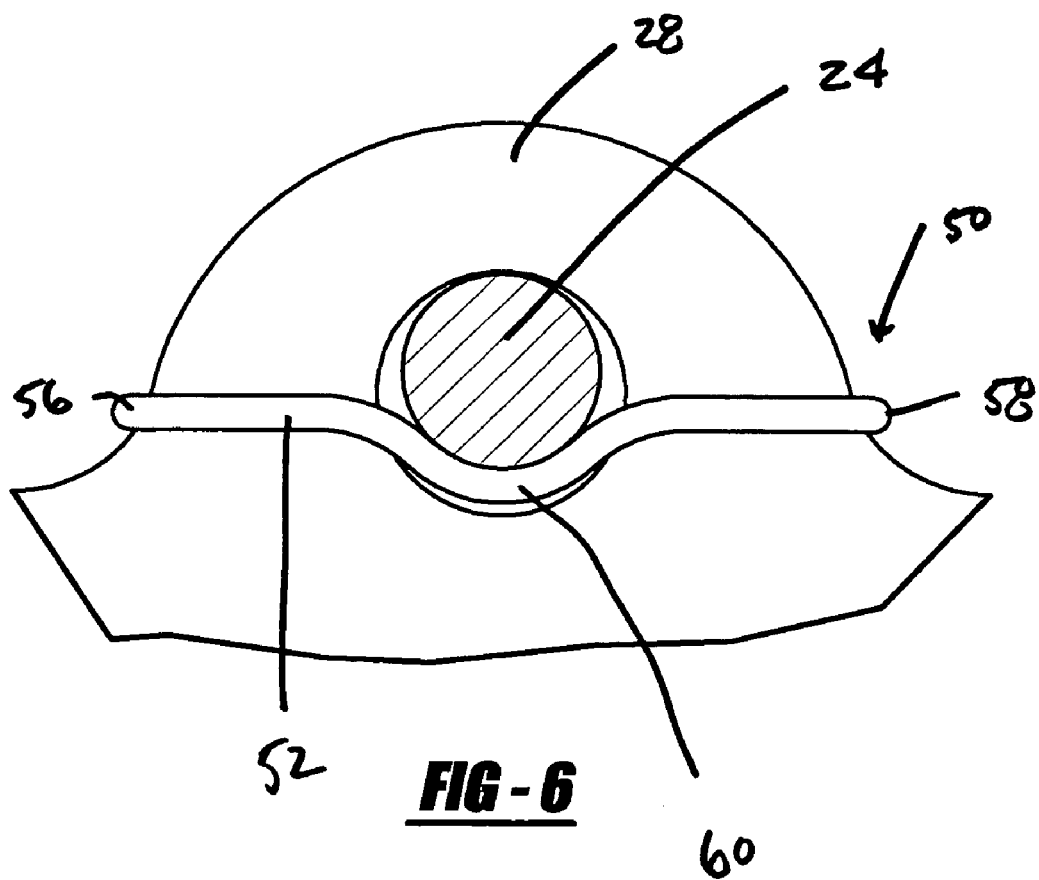
FIG. 6 is a cross-section view of a second or auxiliary spring of FIG. 4.

Also, the design my include an additional spring member 80. The additional spring member 80 has an overall H shape with its vertical legs 82 and 84 in contact with a surface of the pressure plates 14 and 16. The legs 82 and 84 apply a downward force on both of the pressure plates 14 and 16 at two different positions. The horizontal leg 86 of the spring 80 may include an arcuate concave portion to contact the pad pin 24. The horizontal leg 86 as seen in FIG. 6, is raised with respect to the vertical legs 82 and 84 so that when the horizontal leg 86 is positioned on the pad pin 24, a downward force is exerted onto the legs 82 and 84. This downward force, is in turn, exerted on the pressure plates 14 and 16 to hold the pressure plates 14 and 18 against noise and rattling.

The retention springs and auxiliary springs can be stamped from a metal spring material. Also, the retention spring could be manufactured from a metal wire material. The retention springs are relatively small and have a minimal cost. The springs provide necessary forces between the pad pin and pressure plates to reduce excessive movement which causes noise or rattle. Also, due to the minimal contact between the retention springs and the other elements, a potential for corrosion is reduced.

While the above detailed description of the invention is merely exemplary in nature, variations that do not depart from the gist of the invention are intended to be within the scope of the invention. Such variations are not to be regarded as a departure from the spirit and scope of the invention.

What is claimed is:

1. A spring clip for applying force on a brake pad pin and a pressure plate or an inboard or outboard pad pin support of a caliper housing, the spring clip comprising:
    a spring having a pad pin contacting portion for contacting a brake pad pin and exerting a force on the brake pad pin at said pad pin contacting portion, said exerted force in a direction for holding the brake pad pin in position against the pressure plate or pad pin support; and
    a retention portion continuous with said pad pin contacting portion, said retention portion providing a counter-force in a direction against the pressure plate or pad pin support for retaining said spring clip in position on the pressure plate or pad pin support,
    wherein the spring clip includes a depth that is generally equal to a depth of the pressure plate or pad pin support and wherein the spring clip is engages a single brake pad pin.

2. The spring clip according to claim 1 wherein said retention portion surrounds the pad pin support.

3. The spring clip according to claim 2 wherein a second pad pin contacting portion contacts the pad pin.

4. The spring clip according to claim 3 wherein said spring clip has a closed rectangular configuration.

5. The spring clip according to claim 4 wherein said pad pin contacting portions surrounds a portion of the pad pin support.

6. The spring clip according to claim 5 wherein said spring clip is formed from a wire.

7. The spring clip according to claim 1 wherein said pad pin contacting portion has a shape complementary to the pad pin.

8. The spring clip according to claim 7 wherein said pad pin contacting portion has a concave surface for contacting the pad pin.

9. The spring clip according to claim 1 wherein said retention portion has an arcuate portion for contacting a periphery of an aperture in the pressure plate.

10. The spring clip according to claim 9 wherein said spring clip has two substantially identical retention portions.

11. The spring clip according to claim 1 wherein said spring clip has a two opposing C-shaped configuration having an open area on one of its sides.

12. The spring clip according to claim 11 wherein said open area opposes said pin pad contacting portion.

13. A brake caliper comprising:
    a housing;
    at least one pressure plate supported in said housing by a pad pin coupled with a pad pin support formed on an inboard or outboard side of said housing; and
    a spring clip for applying force on said pad pin comprising:
    a spring having a pad pin contacting portion for contacting a brake pad pin and exerting a force on the brake pad pin at said pad pin contacting portion, said exerted force in a direction for holding the pad pin in position against the pressure plate or pad pin support; and
    a retention portion continuous with said pad pin contacting portion, said retention portion providing a counter-force in a direction against the pressure plate or pad pin support for retaining said spring clip in position on the pressure plate or pad pin support,
    wherein the spring clip includes a depth that is generally equal to a depth of the pressure plate or pad pin support and wherein the spring clip engages a single brake pad pin.

14. A brake caliper according to claim 13 wherein said pad pin contacting portion has a shape complementary to the pad pin.

15. A brake caliper according to claim 14 wherein said spring clip has a two opposing C-shaped configuration having an open area on one of its sides.

16. A brake caliper according to claim 15 wherein a second pad pin contacting portion contacts the pad pin.

17. A brake caliper according to claim 16 wherein said spring clip has a closed rectangular configuration.

18. A brake caliper according to claim 17 wherein said pad pin contacting portions surrounds a portion of the pad pin support.

19. A brake caliper according to claim 18 wherein said spring clip is formed from a wire.

20. A brake caliper according to claim 15 wherein said open area opposes said pin pad contacting portion.

21. A brake caliper according to claim 14 wherein said retention portion surrounds the pad pin support.

22. A brake caliper according to claim 21 wherein a second spring applies force on pressure plates coupled with the pad pin.

23. A brake caliper according to claim 14 wherein said pad pin contacting portion has a concave surface for contacting the pad pin.

24. A brake caliper according to claim 13 wherein said retention portion has an arcuate portion for contacting a periphery of an aperture in the pressure plate.

25. A brake caliper according to claim 24 wherein said spring clip has two substantially identical retention portions.

* * * * *